No. 645,344. Patented Mar. 13, 1900.
W. O. WHITE.
FRUIT BASKET.
(Application filed Apr. 25, 1899.)

(No Model.)

Witnesses:

Inventor:
William O. White.
By James L. Norris.
Att'y.

UNITED STATES PATENT OFFICE.

WILLIAM ORMOND WHITE, OF MEMPHIS, TENNESSEE.

FRUIT-BASKET.

SPECIFICATION forming part of Letters Patent No. 645,344, dated March 13, 1900.

Application filed April 25, 1899. Serial No. 714,387. (No model.)

*To all whom it may concern:*

Be it known that I, WILLIAM ORMOND WHITE, a citizen of the United States, residing at Memphis, in the county of Shelby and State of Tennessee, have invented new and useful Improvements in Fruit-Baskets, of which the following is a specification.

My invention relates to fruit-baskets, the object of the same being to provide a device of this kind in which perfect ventilation of the contents may be secured, in which means are provided for preventing concussion or shock at the ends thereof from being transmitted to the contents, and means whereby the contents may be viewed from all sides.

A further object of the invention is to provide a basket which may be readily knocked down for the purpose of reshipment in an empty condition and which may be quickly and easily constructed without tools at the vineyard or orchard.

Other objects and advantages of the invention will hereinafter appear, and the novel features thereof will be set forth in the claims.

Figure 1:
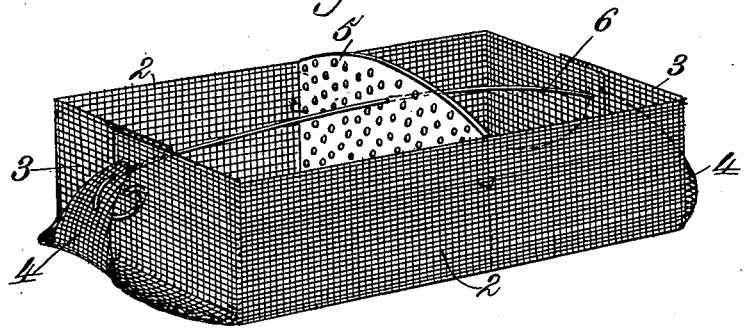
Figure 2:
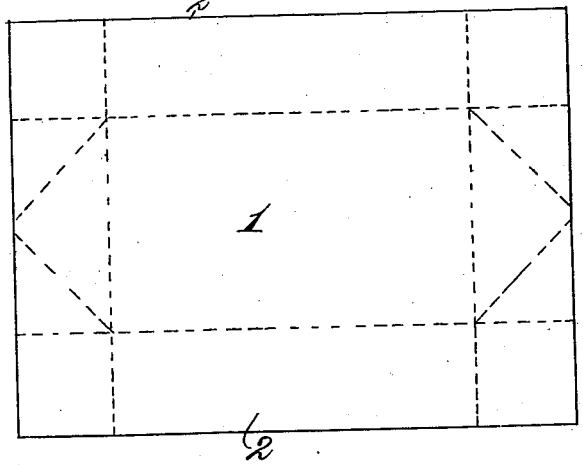
Figure 3:
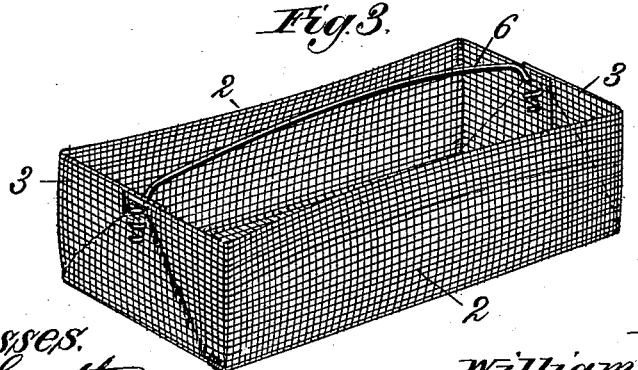

In the drawings forming part of the specification, Figure 1 represents a perspective view of a fruit-basket constructed according to my invention. Fig. 2 is a face view of the blank from which the basket is made. Fig. 3 is a view similar to Fig. 1, showing a modified construction.

Like reference-numerals indicate like parts in the different views.

My improved basket is made from perforated sheet metal, wire-netting, or other reticulated or open-work material and preferably from a blank, as illustrated in Fig. 2, which is bent to form the bottom 1, the sides 2 2, and the ends 3 3. Beyond the ends 3 3 the material of which the basket is made is curved upwardly, outwardly, and then inwardly from the bottom 1, forming spring or resilient cushions 4 4, which are designed to protect the contents of the basket from the shock due to an end thrust or bump when the basket is packed in a shipping-crate or other like receptacle. Between the ends 3 3 and substantially parallel therewith is a partition 5, of perforated wood, sheet metal, wire-netting, or other reticulated or open-work material, the said partition having straight side and lower edges, which when the partition is in place engage the inner surfaces of the sides 2 and bottom 1, respectively. The said partition is held in place by means of a strand of wire 6, which extends therethrough and also through the ends 3 and the spring-cushions 4, the terminals of said wire being coiled or bent back upon themselves for the purpose of locking the said cushions in their raised positions, as shown in Fig. 1 of the drawings. The said partition serves as a brace for the support of the sides 2 2 and as a handle by means of which the basket may be lifted and carried, the disconnection of said partition from the body of the basket being prevented by the strand of wire 6.

From the foregoing description it will be observed that I have produced a basket for fruit and the like in which perfect ventilation is obtained and in which the fruit may be viewed from any side or from the bottom. I have also provided a basket which is extremely simple and cheap in its construction and which may be readily made from the proper materials at the orchard or vineyard without any tools whatever. The basket may also be readily knocked down for the purpose of reshipment by simply removing the ends of the wire 6 from the portion of the body with which they are in engagement and folding up the material from which the body is made into its flattened condition.

The construction heretofore described, and illustrated in Figs. 1 and 2 of the drawings, is the one employed for large baskets. For a small basket I modify the device somewhat, as shown in Fig. 3. By reference to said figure it will be observed that the partition 5 and the cushions 4 are dispensed with, the body of the basket being made from a single piece of open-work material, having its ends connected by a strand of wire, which constitutes the handle. With this form of basket when the fruit is packed slightly therein, the sides and ends being resilient, the basket will expand just enough to hold the fruit in a yielding embrace, preventing the same from settling and bruising, as is the case with fruit packed in baskets which are not provided with resilient sides and ends.

Having now described my invention, what I claim as new, and desire to secure by Letters Patent, is—

1. A basket or receptacle, made in a single piece from open-work material, bent to form integral bottom and sides, and bent upwardly and outwardly from the bottom beyond the ends forming integral resilient cushions, and a wire extending through said ends having its terminals bent or coiled through said cushions for retaining the latter in operative position.

2. A basket or receptacle for fruit or the like, comprising a body made in one piece from open-work material, having integral resilient cushions extending from the bottom outside the ends, a partition intermediate the ends of the body, and a wire extending through said partition and said ends, and having its terminals bent or coiled through said cushions for retaining the latter in operative position, and for preventing the separation of said partition from said body.

In testimony whereof I have hereunto set my hand in presence of two subscribing witnesses.

WILLIAM ORMOND WHITE.

Witnesses:
W. R. WINSTON,
E. W. EPPENSON.